United States Patent
Hao et al.

(10) Patent No.: US 7,185,301 B2
(45) Date of Patent: Feb. 27, 2007

(54) GENERIC METHOD AND APPARATUS FOR IMPLEMENTING SOURCE SYNCHRONOUS INTERFACE IN PLATFORM ASIC

(75) Inventors: Hong Hao, Saratoga, CA (US); Keven Hui, Union City, CA (US); William D. Scharf, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 476 days.

(21) Appl. No.: 10/819,254

(22) Filed: Apr. 6, 2004

(65) Prior Publication Data
US 2005/0226056 A1 Oct. 13, 2005

(51) Int. Cl.
*G06F 17/50* (2006.01)
(52) U.S. Cl. .................... 716/8; 716/9; 716/10; 716/11
(58) Field of Classification Search .............. 716/8–11
See application file for complete search history.

(56) References Cited

U.S. PATENT DOCUMENTS

| | | | |
|---|---|---|---|
| 4,280,070 A * | 7/1981 | Reese et al. ................. 326/70 |
| 5,014,226 A * | 5/1991 | Horstmann et al. ............ 716/4 |
| 5,185,736 A * | 2/1993 | Tyrrell et al. ............... 370/358 |
| 5,355,037 A | 10/1994 | Andresen et al. |
| 5,452,239 A * | 9/1995 | Dai et al. ..................... 703/19 |
| 6,255,879 B1 | 7/2001 | Voss |
| 6,366,149 B1 | 4/2002 | Lee et al. |
| 6,388,533 B2 * | 5/2002 | Swoboda ...................... 331/57 |
| 6,445,065 B1 * | 9/2002 | Gheewala et al. .......... 257/691 |
| 6,807,650 B2 * | 10/2004 | Lamb et al. ................... 716/1 |
| 2004/0114622 A1 * | 6/2004 | Nation et al. ............... 370/465 |
| 2004/0196320 A1 * | 10/2004 | Walmsley et al. ............ 347/12 |

\* cited by examiner

*Primary Examiner*—Vuthe Siek
*Assistant Examiner*—Naum Levin
(74) *Attorney, Agent, or Firm*—Suiter-Swantz PC LLO (57) ABSTRACT

The present invention is a method and apparatus for implementing a source synchronous interface in a platform using a Generic Source Synchronous Interface (GSSI) infrastructure. The GSSI infrastructure includes the GSSI bit slices and clock management system. The GSSI bit slice includes balanced cells and bit delay elements, and may be placed either within or close to IO buffers. The GSSI clock management system includes strategically placed frame delay elements with automatic on-chip calibration and control to satisfy various clock-data phase relationships. The GSSI methodology shows how different SSIs may be constructed by combining the common GSSI architecture with unique metal layer configurations. The GSSI architecture solves a critical challenge for platform-based design such as RapidChip™ and the like. The GSSI approach introduces a completely new way to implement various SSIs based on a common minimally diffused GSSI bit slice and clock management infrastructure. This enables one slice of a platform family to be used for many applications, removing the need to provide different slices with different diffused hard macros for different applications.

22 Claims, 14 Drawing Sheets

GENERIC METHOD AND APPARATUS FOR IMPLEMENTING SOURCE SYNCHRONOUS INTERFACE IN PLATFORM ASIC

CROSS REFERENCE TO RELATED APPLICATIONS

The present application herein incorporates U.S. patent application Ser. No. 10/671,352, entitled "Digital Programmable Delay Scheme with Automatic Calibration," filed Sep. 25, 2003 by reference in its entirety:

FIELD OF THE INVENTION

This invention relates generally to integrated circuits, and particularly to a method and apparatus for implementing a source synchronous interface in a platform ASIC using Generic Source Synchronous Interfaces.

BACKGROUND OF THE INVENTION

Figure 1:
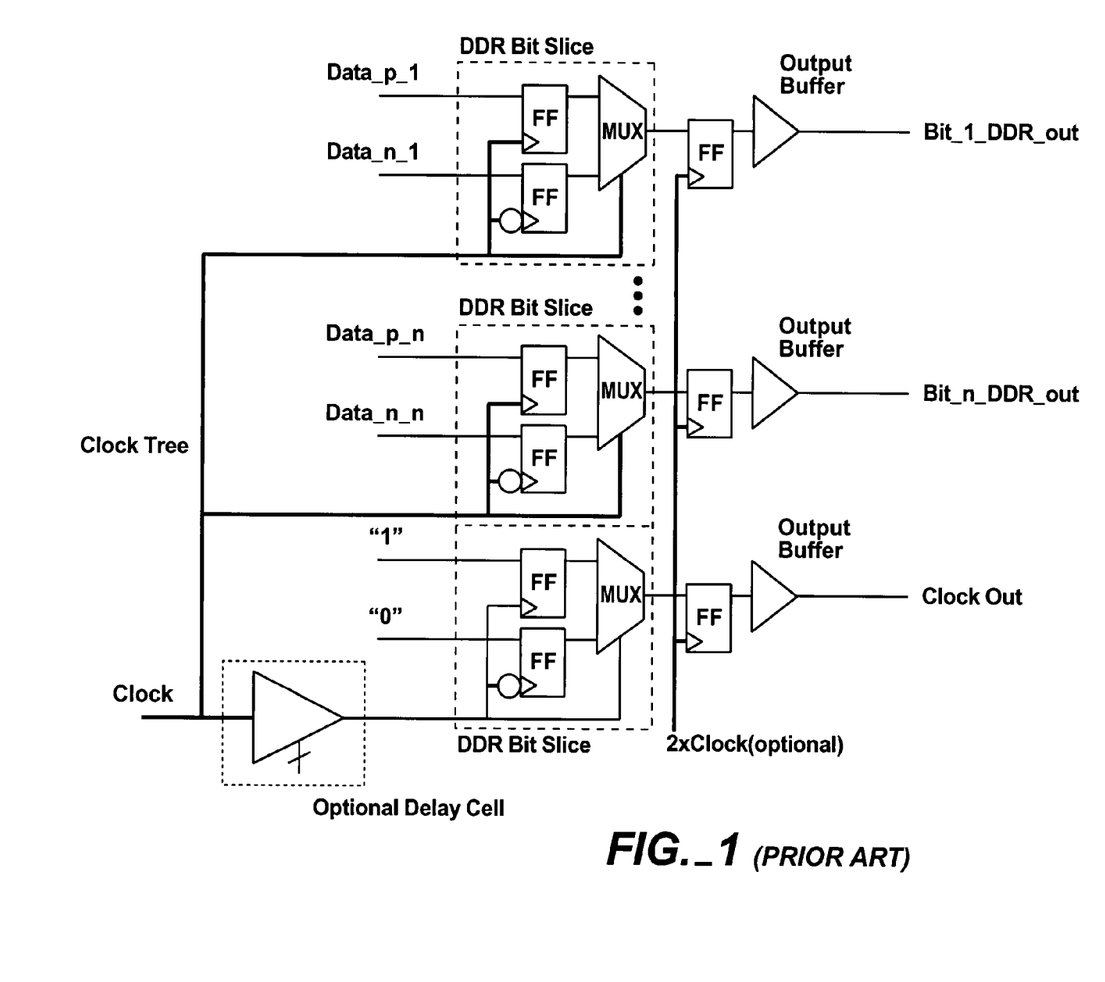
FIG. 1 shows a typical TX (output) implementation of a double-data-rate SSI.
Figure 2:
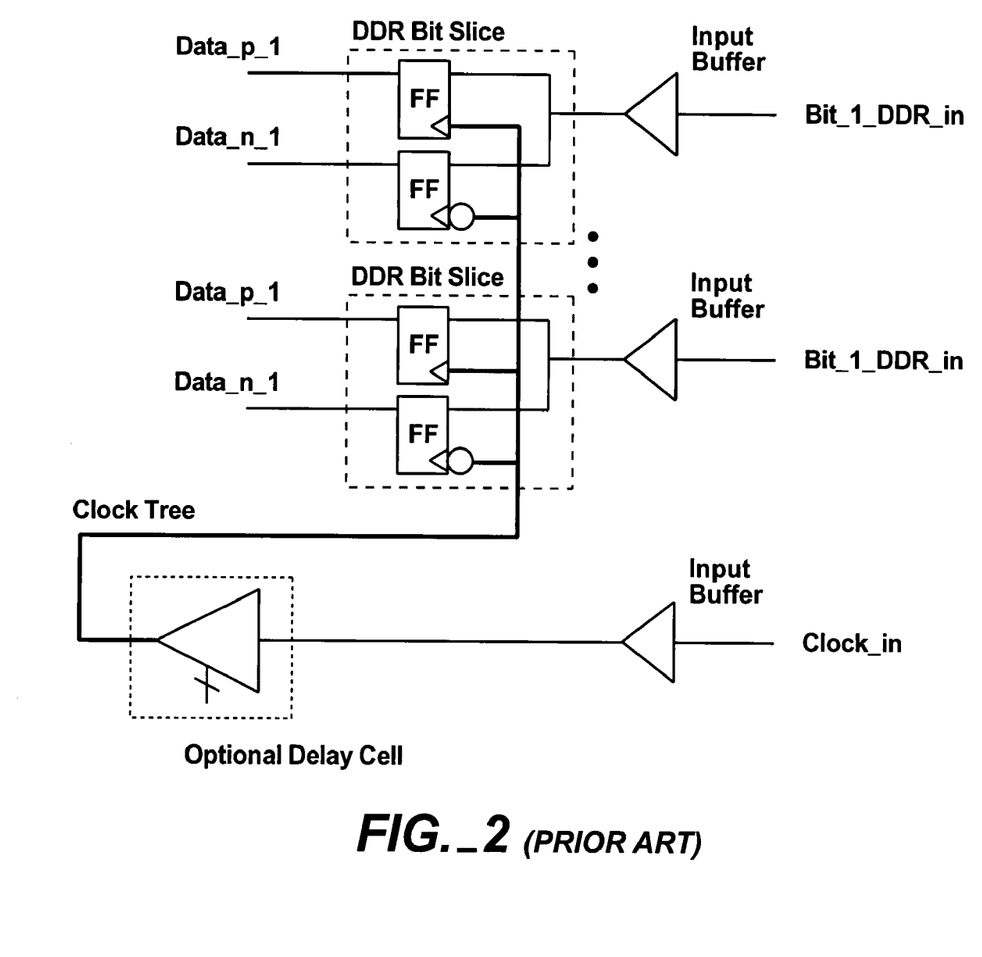
FIG. 2 shows a typical RX (input) implementation of a double-data-rate SSI.

Source Synchronous Interfaces (SSIs) are parallel chip-to-chip interfaces with a forwarded clock. In a SSI, the transmitting side (commonly referred to as TX) sends clock together with data, and the receiving side (commonly referred to as RX) latches the incoming data with the incoming clock. For example, FIG. 1 shows a typical TX (output) implementation of a double-data-rate (DDR) SSI, and FIG. 2 shows a typical RX (input) implementation of a DDR SSI.

SSIs eliminate chip-to-chip interface speed limitations due to clock skew and data propagation delays between chips, thereby significantly boosting the speed range of parallel interfaces. SSIs offer high total throughput at relatively low per-pin data rate and low implementation cost compared to high-speed transceivers. Because of the attractive performance and cost factors, mid to high-speed chip-to-chip interfaces in current VLSI-based systems are commonly implemented as source synchronous, very often as DDR, interfaces. Many variations of SSIs have been adopted as industry standards, such as XGMII (10 Gigabit Medium Independent Interface), RGMII (Reduced Gigabit Medium Independent Interface), SFI4 (SERDES to Framer Interface, Level 4), RapidIO, PCI-X, HyperTransport, DDR/QDR memory interfaces, and the like. Additionally, numerous variations are in use in proprietary forms.

In general, the speed of SSIs is limited by the following factors: (1) skew across the entire parallel bus, including data; (2) total jitter on data and clock channels; (3) duty cycle distortion on clock and data paths; (4) simultaneous switching output (SSO) noise; and (5) width of interface (the wider the interface, the more skew is expected).

Due to the high-speed nature and the foregoing-indicated limitations, SSIs are commonly implemented as custom-designed hard macros. The components in the interface are carefully designed to achieve minimal duty cycle distortion and maximum balance between propagation delays through different paths.

Platform-based IC (integrated circuit) design is a powerful concept for coping with the increased pressure on time-to-market, design and manufacturing costs. A platform is a large-scale, high-complexity semiconductor device that includes one or more of the following elements: (1) memory; (2) an embedded processor; (3) other IP (intellectual property) block; (4) a customizable array of transistors (the "transistor fabric"); (5) an embedded programmable logic block; and (6) interconnect. RapidChip™, developed by LSI Logic Corp. is an instance of a platform. The transistor fabric and/or the embedded programmable logic block may give the platform its key attribute of customizability (i.e., the ability for users to create unique IC products). The basic idea behind platform-based design is to avoid designing and manufacturing a chip from scratch. Some portion of the chip's architecture is predefined or diffused for a specific type of application. This portion is fixed (not customizable). Through extensive design reuse, platform-based design may provide faster time-to-market and reduce design cost.

Under a platform approach, there are two distinct steps entailed in creating a final end-user product: a prefabrication step and a customization step. In a prefabrication step, a set of slices is built on a wafer. A slice is a pre-manufactured chip in which all silicon layers have been built, leaving the metal layers or top metal layers to implement the customer's unique design. For example, the RapidChip™ Integrator family, developed by LSI Logic Corp., is a family of slices. One or more slices may be built on a single wafer. It is understood that a slice may include one or more bottom metal layers or may include no metal layers at all. In a preferred embodiment of the prefabrication step, portions of the metal layers are pre-specified to implement the pre-defined blocks of the platform and the diffusion processes are carried out in a wafer fab. That is, the base characteristics, in terms of the IP, the processors, the memory, the programmable logic and the customizable transistor array, are all pre-placed in the design and pre-diffused in the slice. Thus, a slice is essentially a partially manufactured IC. The customer must introduce its unique functionality into the slice, making it a complete device. The customer-designed function is implemented by defining the interconnection of the elements of the transistor fabric to reflect the desired functionality. This interconnection is mapped into a set of metal layers, merged with the pre-defined blocks, and the metal layers (or late-metal components) are laid down, completing the device. Thus, the transistor fabric may be used to create the unique aspects of the design. The remaining (non-customizable) regions of the slice may be referred to as diffused logic.

In a conventional approach, because each SSI needs to be custom designed with special components, the interface hard macro often need be diffused in the slice of a platform. However, each diffused hard macro takes away otherwise usable die area and occupies valuable chip IOs. Moreover, a diffused hard macro supports only a fixed interface. Due to the numerous variations of SSIs, the flexibility of a slice with a particular diffused interface is limited. Consequently, a large number of slices may be required to support the different variations, making the support of SSIs in a platform very costly. Thus, the conventional approach of dedicated, custom designed hard macros for implementing SSIs presents serious challenges to the value proposition of the platform-based IC design.

As indicated above, the conventional approach relies on building dedicated, custom designed hard macros for implementing SSIs. Those of ordinary skill in the art will understand that only for low speed applications may the interface hard macros be built directly with the native transistor fabric embedded in a slice. For nearly all mid to high-speed applications, at least some diffused circuitry is required. For the 0.13-micron process node, the "mid-speed" frequency range is roughly 250 to 1000 MHz.

Thus, it would be desirable to provide a method and apparatus for implementing various types of SSIs for a platform based on a common SSI architecture.

SUMMARY OF THE INVENTION

Accordingly, the present invention is directed to a method and apparatus for implementing a source synchronous interface in a platform using a common infrastructure—the Generic Source Synchronous Interface (GSSI). According to an exemplary aspect of the present invention, the GSSI infrastructure includes the GSSI bit slices and clock management system. The GSSI bit slice includes: (1) balanced cells for mux/demux purposes, and (2) programmable bit delay elements for skew control on a per-channel basis. Bit slices can be placed either inside or close to IO buffers. The GSSI clock management system includes, in addition to the aforementioned bit delay elements, strategically placed programmable frame delay elements with automatic on-chip calibration and control to satisfy various clock-data phase relationships. The GSSI methodology shows how different SSIs may be constructed by combining the common GSSI architecture with unique metal layer configurations. The GSSI architecture solves a critical challenge for the platform-based design such as RapidChip™ and the like. The GSSI approach introduces a completely new way to implement various SSIs based on a common minimally diffused GSSI bit slice and clock management infrastructure. This enables one slice to be used for many applications, removing the need to provide different slices with different diffused hard macros for different applications.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and, together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

The present invention presents a GSSI architecture for a platform, which may enable different types of SSIs to be implemented on the same slice over the same die area based on a common transistor fabric infrastructure. The present invention eliminates the need to diffuse a hard macro for each application, thus allowing a single slice of a platform to be used for many different applications. The present invention introduces a completely new and flexible way of implementing SSIs that fully enables the advantages of a platform-based design such as RapidChip™, and the like.

The present invention takes advantage of the unique and common characteristics of SSIs. According to one aspect of the present invention, a method for implementing a generic source synchronous interface architecture may include the following steps. First, a common set of critical components for building SSIs may be identified. Then, the common set of critical components may be diffused into a slice of a platform. Next, a SSI may be built by configuring metal layers of the transistor fabric for a customer instance.

A. GSSI Details

All source synchronous interfaces (SSIs), both single data rate (SDR) and double data rate (DDR), require highly balanced cells to achieve maximal data rate. These cells may include the following balanced cells:

Balanced flip-flops—flip-flops that have equal clock to output Q delays, small setup and hold time. Ideally both rising edge and falling edge flip-flops should be available.

Balanced multiplexers—multiplexers with equal input-to-output delays for all data inputs and polarities, equal select-to-output delays for all select inputs, and equal output rise and fall times.

Balanced clock trees—clock trees that have equal propagation delays, and equal rise and fall times to all destinations. These usually require balanced clock buffers and phase splitters.

Additionally, many SSI implementations require balanced and programmable delay cells, which are delay cells with equal rise and fall times, and programmable delay settings to adapt to various clock-data phase relationships. The programmable delay cells may be implemented using analog delay lock loop (DLL) circuits, or digital delay lines, or the like. These delays are used in two general ways: (1) to control delay between the data-signals as a group and a clock (or strobe) signal, (2) to compensate for skew between the individual data signals.

The present GSSI includes the following elements: (1) a GSSI bit slice; and (2) a GSSI clock management system.

(1) GSSI Bit Slice

A GSSI bit slice is a group of diffused balanced cells that is matched to an IO buffer. The bit slice may include balanced flip-flops, multiplexes, clock trees, delay elements, and the like, which are not available in circuits constructed from the platform transistor fabric (at least not with the accuracy required for mid/high speed operation). The GSSI bit slice may be placed within or close to the matching IO buffer. GSSI bit slices are preferably placed at an equal distance to each other, and to IO buffers. In a slice of a platform family such as RapidChip™, or the like, the IO buffers are preferably configurable IO buffers that may be configured in metal layers to support different IO standards, and preferably include programmable impedance control for drivers and embedded programmable resistive termination for receivers.

There is one bit slice for each signal IO. The cells in a GSSI bit slice are not interconnected in a diffused slice of a platform. The GSSI bit slice is configured in metal only when the GSSI bit slice is used for the implementation of a specific interface. If a GSSI bit slice is not used, signal routing above the diffused area is allowed, which is called pave-over in the RapidChip™ terminology.

The selection of cells included in a GSSI bit slice may provide a minimal but sufficient set of balanced cells to allow for 2-to-1, 4-to-1 and even 8-to-1 serialization and deserialization of the SSI signals, and a balanced bit delay element which is typically used to allow for adjustment of channel-to-channel skew.

Figure 3A:
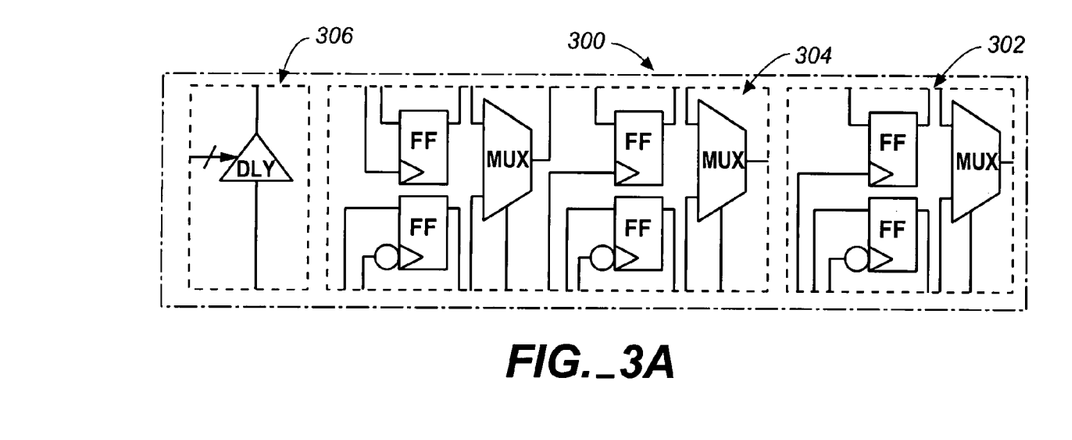
FIG. 3A shows a GSSI bit slice in accordance with an exemplary embodiment of the present invention, including both the bit delay and the balanced components.
Figure 3B:
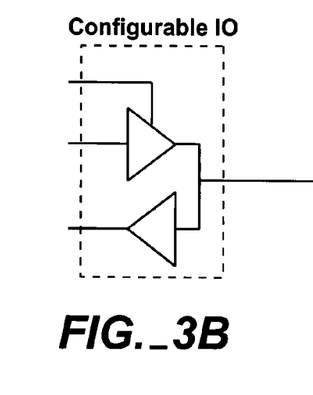
FIG. 3B shows a configurable IO buffer.

FIG. 3A shows a GSSI bit slice 300 in accordance with an exemplary embodiment of the present invention, and FIG. 3B shows a configurable IO buffer. Preferably, the GSSI bit slice 300 is located within or close to a matching IO buffer. The GSSI bit slice 300 includes a set of cells 302 comprising two balanced flip-flops and one multiplexer. The set of cells 302 are mandatory for any GSSI bit slice because they provide the minimal set of cells for double data rate (DDR) designs. The GSSI bit slice 300 may further include a second set of cells 304 comprising additional flip-flops and multiplexers. For example, as shown in FIG. 3A, the second set of cells 304 may include necessary cells for up to 4-to-1 serialization and deserialization. In addition, the GSSI bit slice 300 may optionally include a programmable bit delay element 306 for providing delay to compensate for channel-to-channel skew. In an implementation of such a delay, the bit delay may provide the fine delay, and may also be supplemented by further (coarse) delay circuitry using the transistor fabric.

Figure 4:
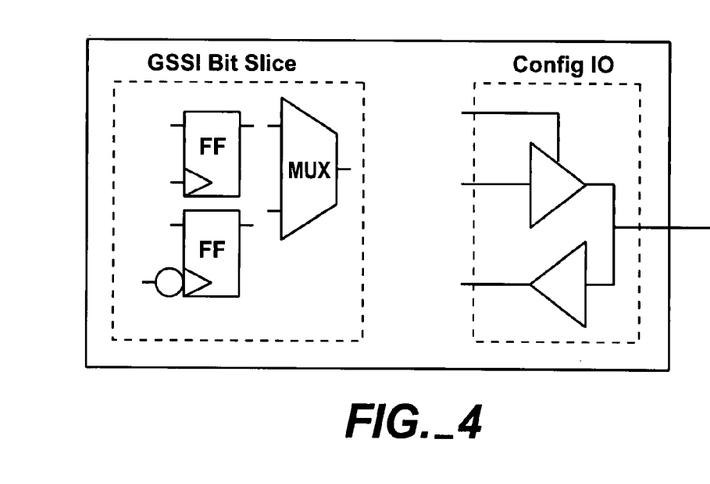
FIG. 4 shows a GSSI bit slice in accordance with an additional exemplary embodiment of the present invention, where the GSSI bit slice is part of the matching IO buffer.
Figure 5:
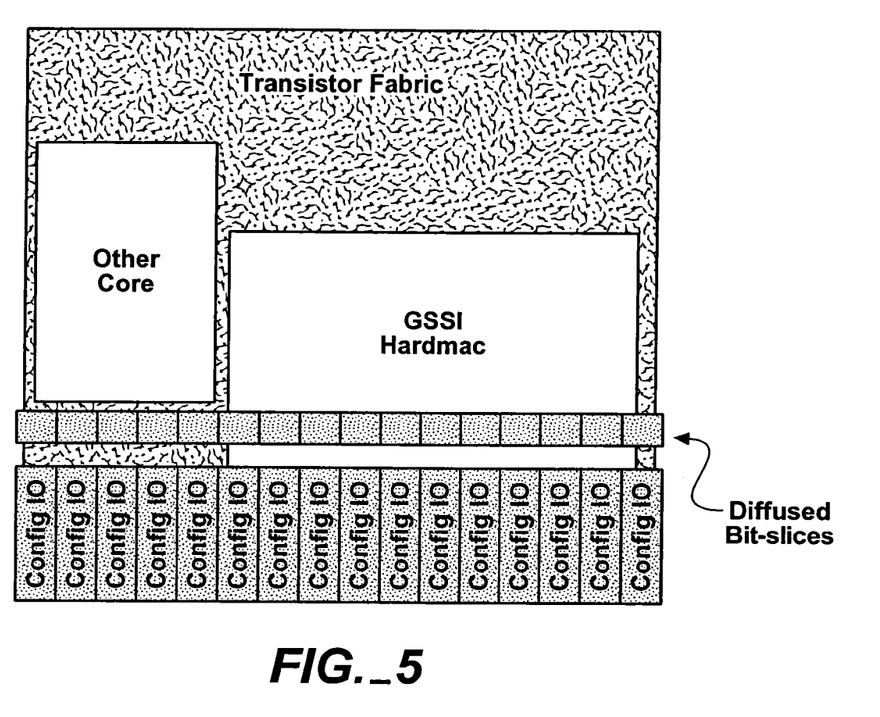
FIG. 5 is a schematic diagram illustrating the diffused GSSI bit slices relative to IO buffers and other diffused hard macros within a slice in accordance with an exemplary embodiment of the present invention.

The GSSI bit slice may be implemented in two ways. The first is to include the GSSI bit slice as part of the matching IO buffer (see, e.g., FIG. 4). In this fashion, the die area may be kept clear, and thus the platform-based design flow for custom user logic may be simplified. The drawback is that the number of cells that may be included in the GSSI bit slice is limited due to the IO buffer area limitation. The second option is to keep the GSSI bit slice out of the IO buffer, as a diffused cell group (see, e.g., FIG. 5). This option allows for the inclusion of a larger number of cells, and thus richer functionality to support further SSI variations. The GSSI bit slice is preferably diffused very close to the IO buffer to ensure maximum performance. However, it is understood that not all IO buffers need the GSSI bit slices. Only IO buffers intended for SSI usage need to have GSSI bit slices matched to them.

(2) Frame, Frame Delay, and GSSI Clock Management System

For some SSIs, it is expected that the bit delay elements, even combined with additional coarse delay as described above, may be insufficient to meet the timing requirements of the interface. For this reason, additional diffused delay elements may be provided. One such delay element is shared by a block of signals known as a frame. This shared delay element is called a frame delay element. The typical application of a frame delay is to delay a clock (or strobe) signal by the appropriate amount to achieve the desired clock-data phase relationship required in a particular SSI.

Figure 6A:
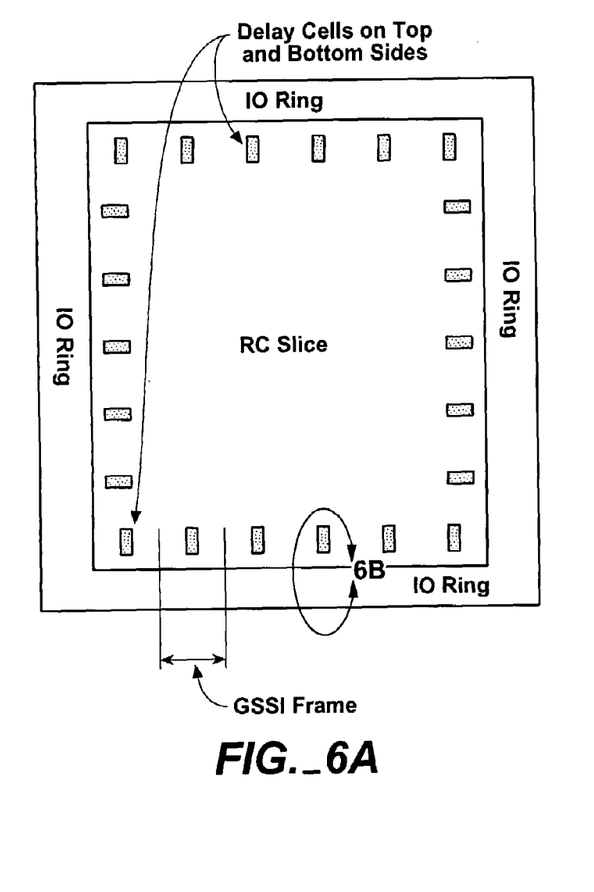
FIGS. 6A and 6B are schematic diagrams illustrating that the programmable frame delay element is placed in the transistor fabric and around a chip's IO periphery in accordance with an exemplary embodiment of the present invention.
Figure 6B:
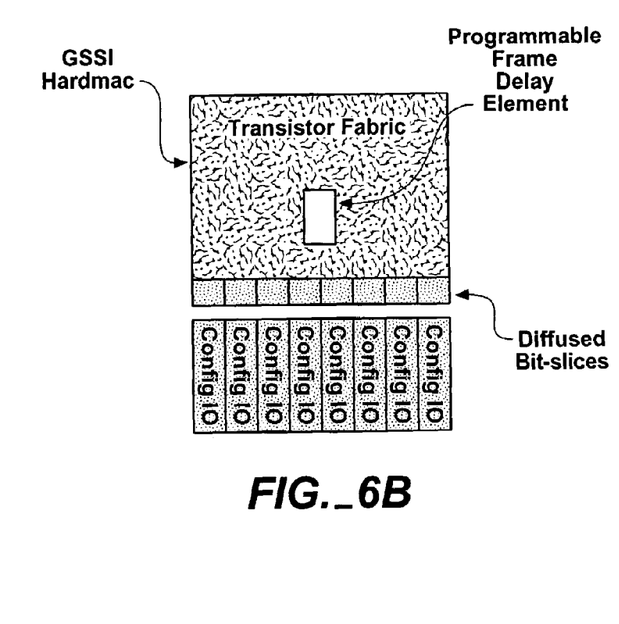
Figures 7A, 7B:
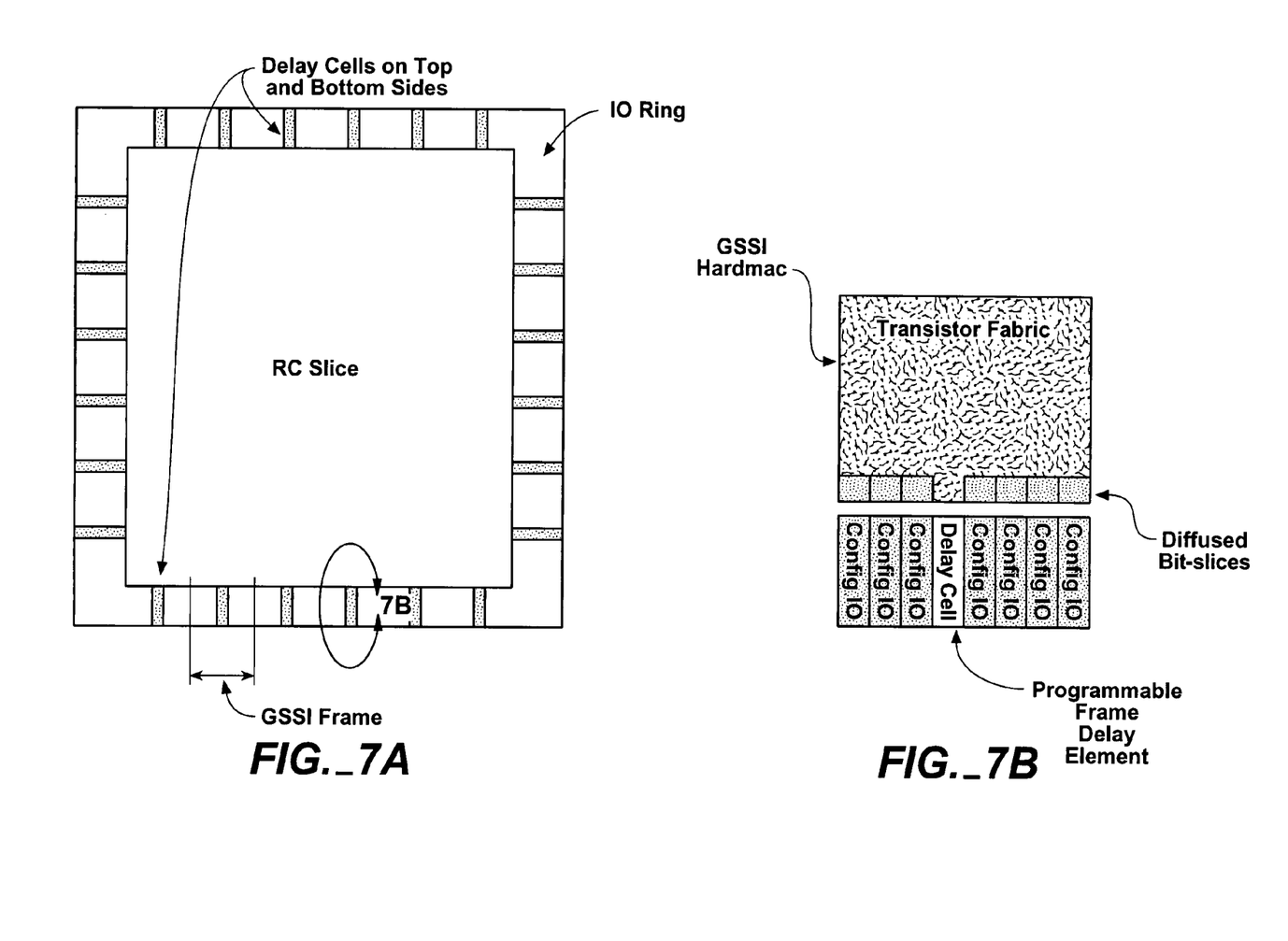
FIGS. 7A and 7B illustrate an alternative scheme, with the programmable frame delay element occupying the IO slot in accordance with the present invention.
Figure 8A:
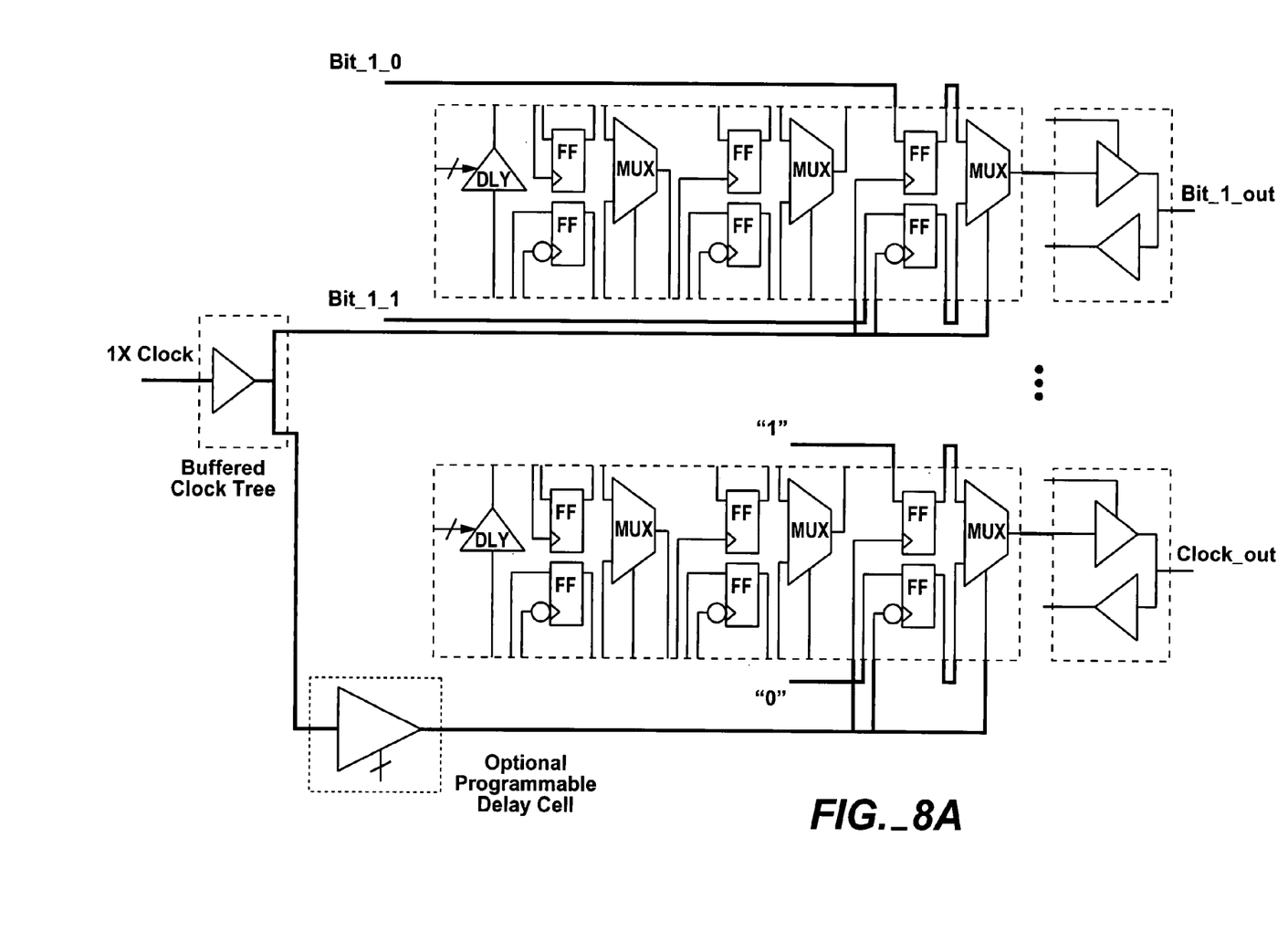
FIG. 8A shows a TX (output) implementation with 1× clock (DDR) using the GSSI in accordance with an exemplary embodiment of the present invention.
Figure 8B:
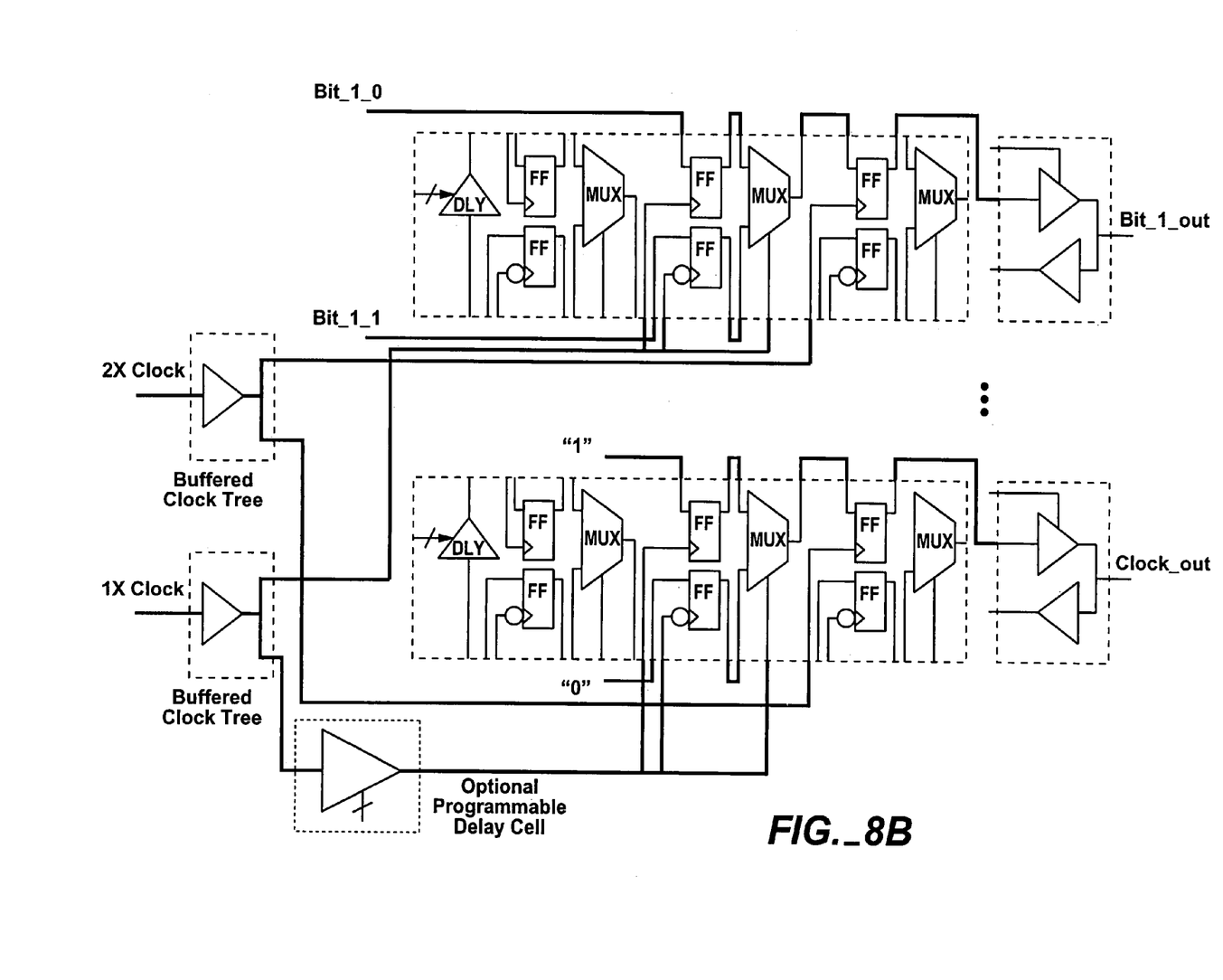
FIG. 8B shows a TX (output) implementation with 2× clock (SDR) using the GSSI in accordance with an exemplary embodiment of the present invention.
Figure 9A:
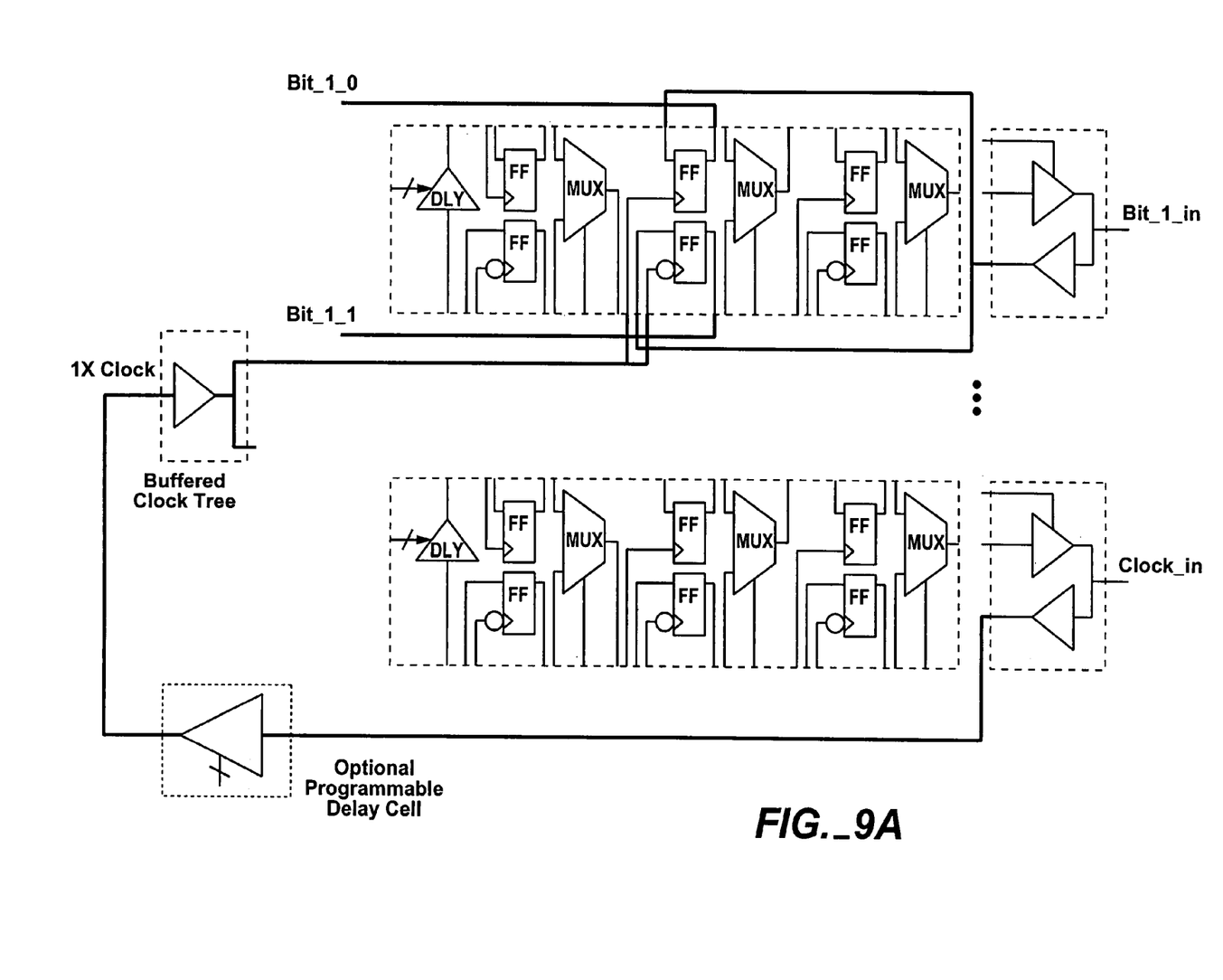
FIG. 9A shows a RX (input) implementation with 1× clock (DDR) using the GSSI in accordance with an exemplary embodiment of the present invention.
Figure 9B:
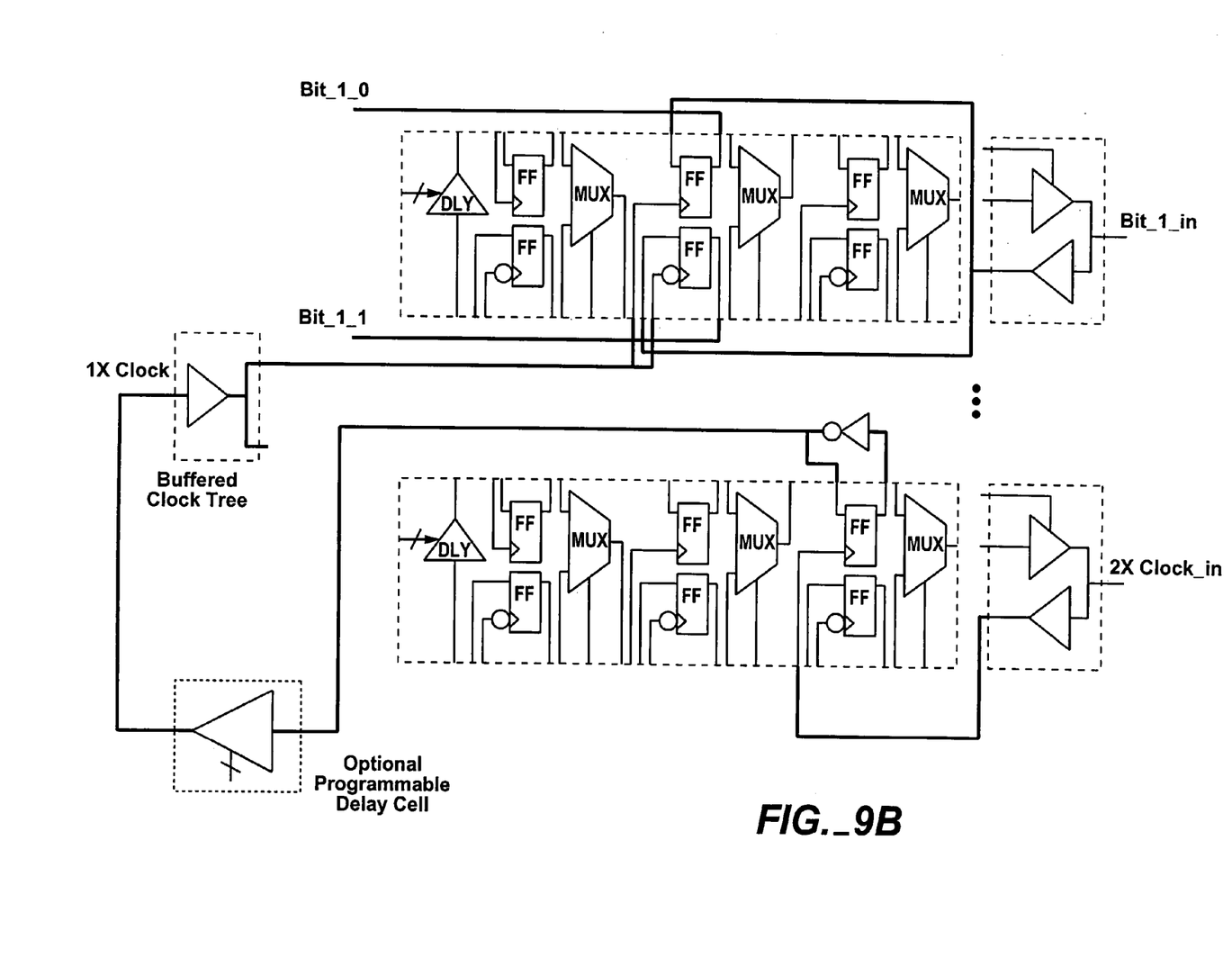
FIG. 9B shows a RX (input) implementation with 2× clock (SDR) using the GSSI in accordance with an exemplary embodiment of the present invention.
Figure 10:
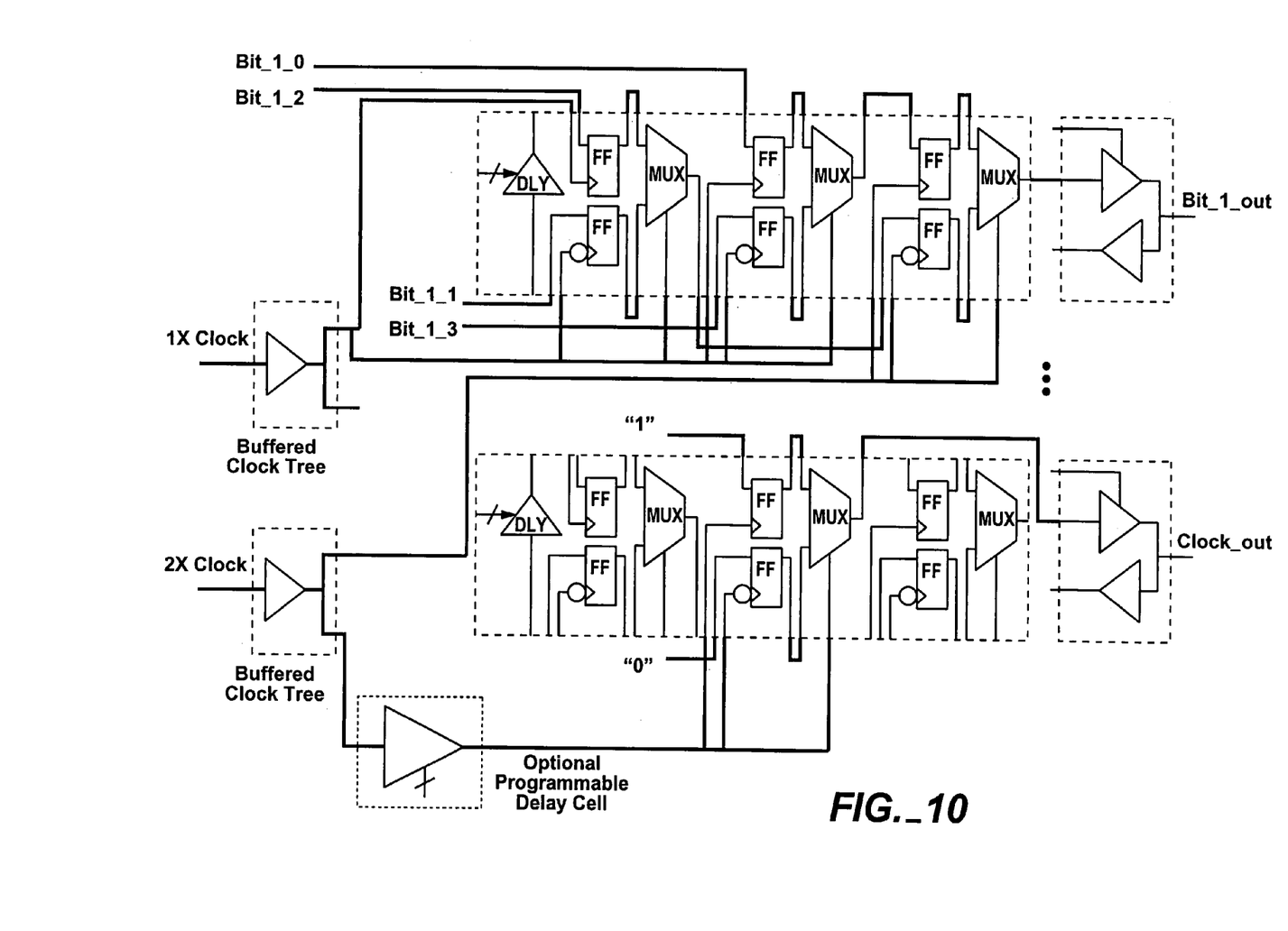
FIG. 10 shows a TX (output) implementation with 4-to-1 serialization using the GSSI in accordance with an exemplary embodiment of the present invention.
Figure 11:
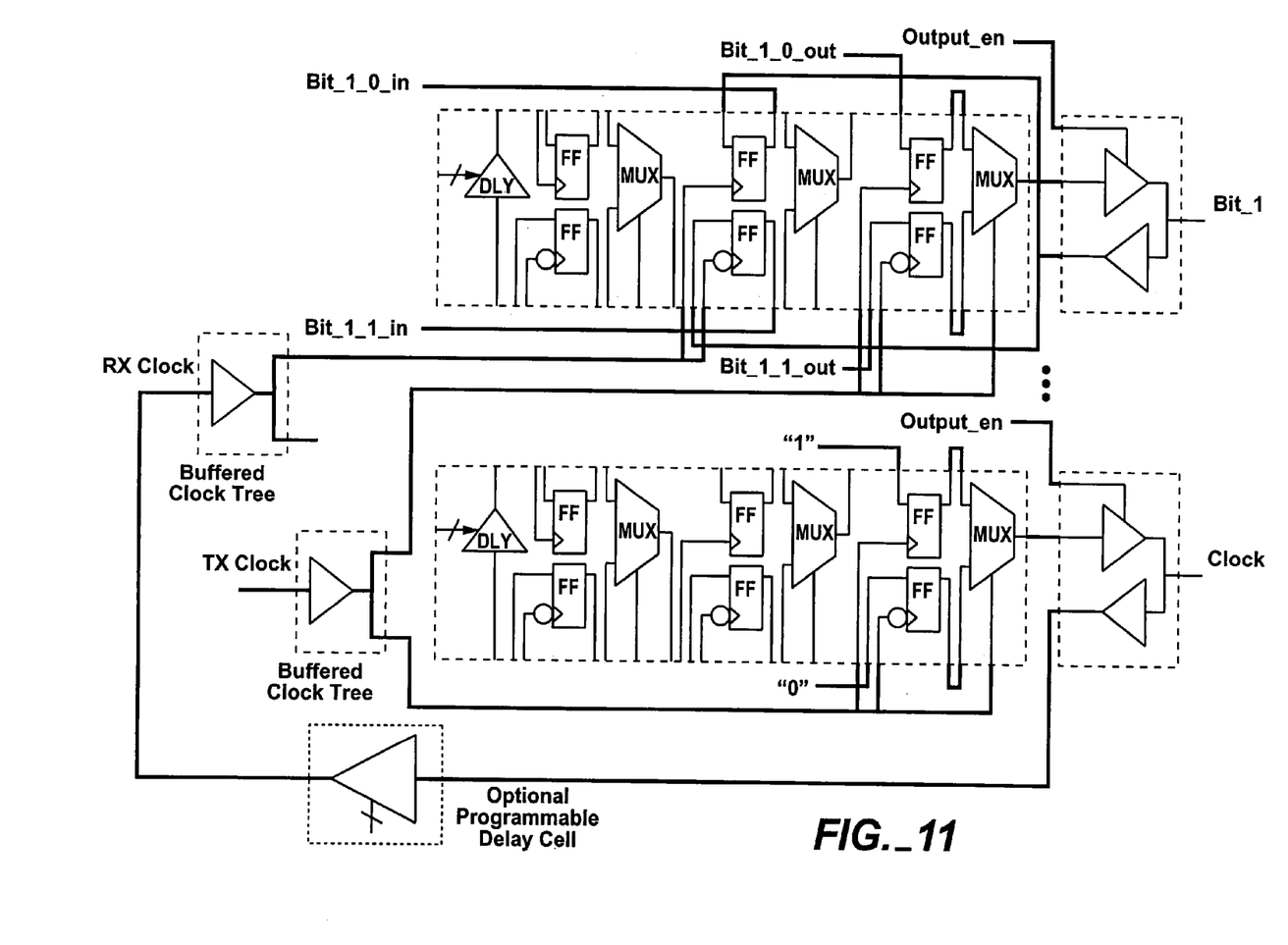
FIG. 11 shows an implementation for bi-directional interfaces using the GSSI in accordance with an exemplary embodiment of the present invention.

FIGS. 6A and 6B illustrate how frames (each frame incorporating one frame delay element) may be placed around a chip's IO periphery in accordance with an exemplary embodiment of the present invention. FIGS. 7A and 7B show an alternative configuration, with the frame delay element occupying an "IO slot"— a region normally reserved for the IO function. This configuration has the advantage of keeping the transistor fabric free, resulting in a simpler methodology for user customization.

Critical parameters for the GSSI delay elements may include the total delay range, the step size, and the placement spacing on a slice. These are determined based on target applications. The GSSI clock management system may include the combined set of delay elements described above, and a method to calibrate and control the delays. The details of the GSSI clock management are described in U.S. patent application Ser. No. 10/671,352, entitled "Digital Programmable Delay Scheme with Automatic Calibration," filed Sep. 25, 2003, herein incorporated by reference in its entirety B. Building SSIs Using GSSI One of the most critical benefits of GSSI is that various SSIs may be built by using a common infrastructure of diffused GSSI bit slices and clock management components on a single slice of a platform. FIGS. 8A, 8B, 9A, 9B, 10 and 11 illustrate examples of several SSI implementations using the same GSSI bit slices and delay elements.

Figure 12A:
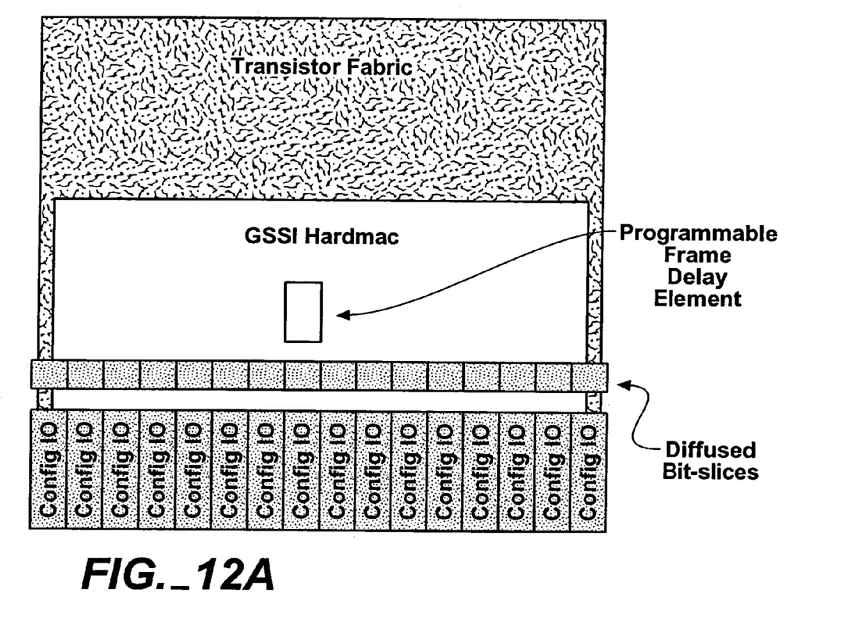
FIG. 12A shows a GSSI architecture in accordance with an exemplary embodiment of the present invention.
Figure 12B:
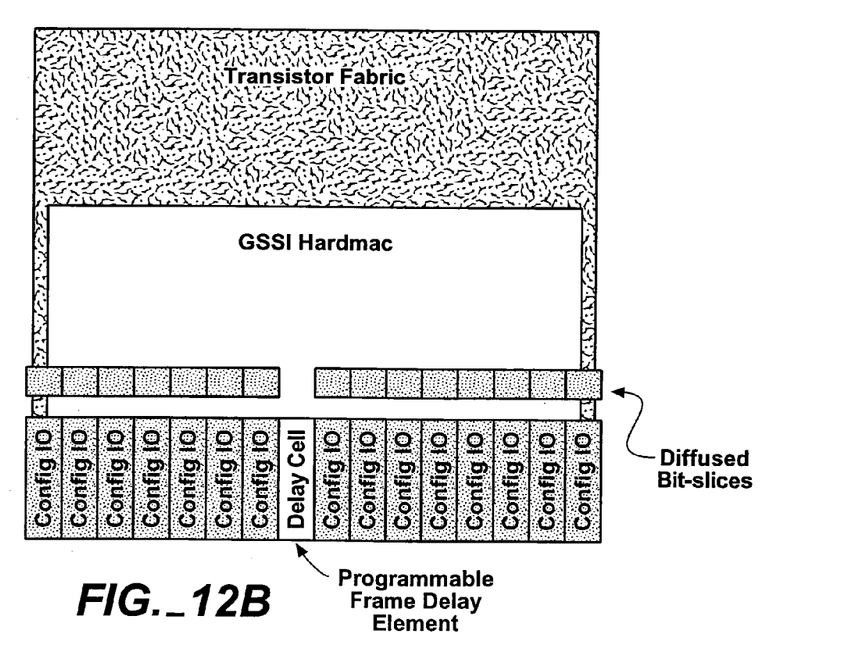
FIG. 12B illustrates an alternative embodiment of a GSSI architecture, with the programmable frame delay element occupying IO slots in accordance with the present invention.

At the chip level, a GSSI-based SSI in accordance with an exemplary embodiment of the present invention is illustrated in FIG. 12A. It is noted that the transistor fabric is uniquely configured for each SSI implementation, and is usable by either interface implementations or by other user logic when SSIs are not needed. FIG. 12A illustrates the essence and benefits of GSSI—that various interfaces are all built on top of the same minimally diffused GSSI infrastructure. FIG. 12B illustrates a GSSI-based SSI, on a slice using the "delay in IO-slot" configuration shown in FIG. 7B.

GSSI introduces a new way to implement SSIs for RapidChip™ and other IC platform families. However, GSSI does not restrict the way an SSI is implemented. For SSIs that require custom hard macros, the conventional custom design approaches currently in use may be used. Interfaces may still be implemented as hard macros, especially when optimal performance is a requirement. In uses not requiring optimal performance, the GSSI diffused infrastructure may accommodate multiple uses of the same slice.

Figure 13:
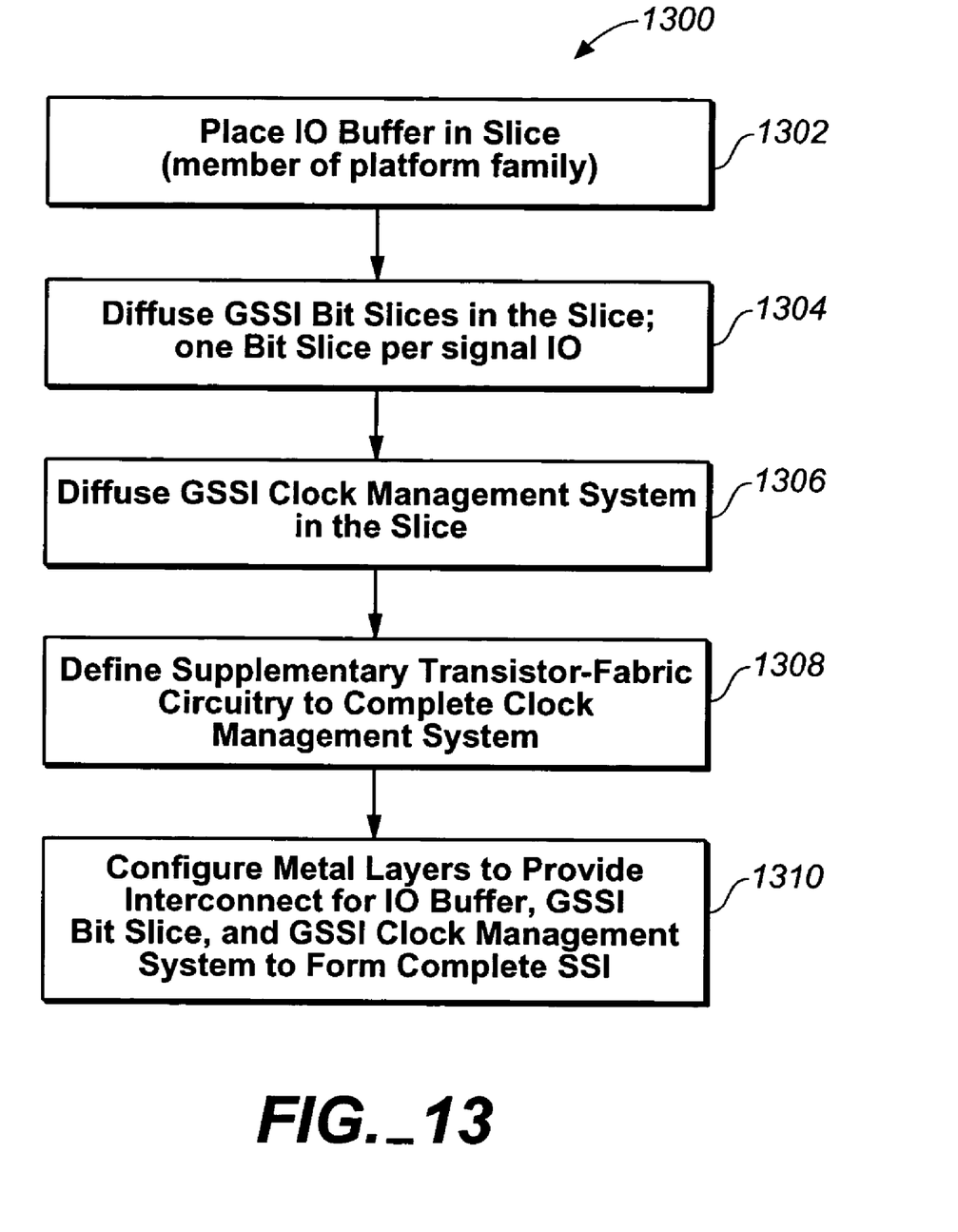
FIG. 13 shows an exemplary process for implementing a SSI in a platform using the GSSI in accordance with an exemplary embodiment of the present invention.

FIG. 13 shows an exemplary process 1300 for implementing a SSI in a platform using the GSSI in accordance with an exemplary embodiment of the present invention. The process 1300 may start with a step 1302 in which an IO buffer is placed in a slice, which is a member of the platform family. Then, a GSSI bit slice may be diffused into the slice and matched to the IO buffer 1304. Next, a GSSI clock management system including frame delay elements may be diffused into the slice 1306. Then, supplementary transistor fabric circuitry may be defined to complete clock management system 1308. Next, metal layers of the platform may be configured to provide interconnect for the IO buffer, the GSSI bit slice, the GSSI clock management system, and other circuitry, to form a complete SSI in the platform 1310.

The present GSSI architecture solves a critical challenge for platform-based design such as RapidChip™ and the like. The GSSI approach introduces a completely new way to implement various SSIs based on the same minimally diffused GSSI bit slice and clock management infrastructure. This allows one slice of a platform to be used for many applications, removing the current need to provide different slices with different diffused hard macros for different applications.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form hereinbefore described being merely an explanatory embodiment thereof, it is the intention of the following claims to encompass and include such changes.

What is claimed is:

1. A method for implementing a source synchronous interface in a platform using generic source synchronous interfaces, comprising steps of:
    placing at least one IO buffer in a slice of a platform;
    diffusing at least one generic source synchronous interface bit slice in said slice of said platform, each of said at least one generic source synchronous interface bit slice including at least one balanced flip-flop, at least one balanced multiplexer, and being matched to one of said at least one IO buffer;
    diffusing a generic source synchronous interface clock management system for calibrating and controlling delays through clock trees, said generic source synchronous interface clock management system including at least one frame delay element in said slice of said platform;
    defining supplementary transistor fabric circuitry in said platform to complete said generic source synchronous interface clock management system; and
    configuring metal layers of said platform to provide interconnect for said at least one generic source synchronous interface bit slice, said at least one IO buffer, and said generic source synchronous interface clock management system to perform at least one of a receiving side (RX) and transmitting side (TX) implementation of a source synchronous interface in said platform.

2. The method of claim 1, wherein said at least one IO buffer is a configurable IO buffer that may be configured in said metal layers to support different IO standards.

3. The method of claim 1, wherein said each of said at least one generic source synchronous interface bit slice is placed next to and has an equal distance to its matching IO buffer.

4. The method of claim 1, wherein said each of said at least one generic source synchronous interface bit slice is part of its matching IO buffer.

5. The method of claim 1, wherein said at least one frame delay element is placed near said at least one IO buffer.

6. The method of claim 5, wherein said at least one frame delay element is evenly distributed along said at least one IO buffer so that each of said at least one frame delay element may be used to target IO buffers that are close to said each of said at least one frame delay element.

7. The method of claim 1, wherein each of said at least one frame delay element occupies an IO slot of said at least one IO buffer.

8. The method of claim 7, wherein said at least one frame delay element is evenly distributed along said at least one IO buffer so that said each of said at least one frame delay element may be used to target IO buffers that are close to said each of said at least one frame delay element.

9. The method of claim 1, wherein said at least one of a RX and TX implementation is with single data rate or with double data rate.

10. The method of claim 1, wherein said at least one of a RX and TX implementation is with 2-to-1, 4-to-1, or 8-to-1 serialization and deserialization.

11. The method of claim 1, wherein said each of said at least one generic source synchronous interface bit slice includes a programmable bit delay element.

12. An apparatus for implementing a source synchronous interface in a platform using generic source synchronous interfaces, comprising:
    means for placing at least one IO buffer in a slice of a platform;
    means for diffusing at least one generic source synchronous interface bit slice in said slice of said platform, each of said at least one generic source synchronous interface bit slice including at least one balanced flip-flop, at least one balanced multiplexer, and being matched to one of said at least one IO buffer;
    means for diffusing a generic source synchronous interface clock management system for calibrating and controlling delays through clock trees, said generic source synchronous interface clock management system including at least one frame delay element in said slice of said platform;
    means for defining supplementary transistor fabric circuitry in said platform to complete said generic source synchronous interface clock management system; and
    means for configuring metal layers of said platform to provide interconnect for said at least one generic source synchronous interface bit slice, said at least one IO buffer, and said generic source synchronous interface clock management system to perform at least one of a receiving side (RX) and transmitting side (TX) implementation of a source synchronous interface in said platform.

13. The apparatus of claim 12, wherein said at least one IO buffer is a configurable IO buffer that may be configured in said metal layers to support different IO standards.

14. The apparatus of claim 12, wherein said each of said at least one generic source synchronous interface bit slice is placed next to and has an equal distance to its matching IO buffer.

15. The apparatus of claim 12, wherein said each of said at least one generic source synchronous interface bit slice is part of its matching IO buffer.

16. The apparatus of claim 12, wherein said at least one frame delay element is placed near said at least one IO buffer.

17. The apparatus of claim 16, wherein said at least one frame delay element is evenly distributed along said at least one IO buffer so that each of said at least one frame delay element may be used to target IO buffers that are close to said each of said at least one frame delay element.

18. The apparatus of claim 12, wherein each of said at least one frame delay element occupies an IO slot of said at least one IO buffer.

19. The apparatus of claim 18, wherein said at least one frame delay element is evenly distributed along said at least one IO buffer so that said each of said at least one frame delay element may be used to target IO buffers that are close to said each of said at least one frame delay element.

20. The apparatus of claim 12, wherein said at least one of a RX and TX implementation is with single data rate or with double data rate.

21. The apparatus of claim 12, wherein said at least one of a RX and TX implementation is with 2-to-1, 4-to-1, or 8-to-1 serialization and deserialization.

22. The apparatus of claim 12, wherein said each of said at least one generic source synchronous interface bit slice includes a programmable bit delay element.

* * * * *